J. KWAPIEN.
RESILIENT WHEEL.
APPLICATION FILED AUG. 21, 1917.

1,254,413.

Patented Jan. 22, 1918.

WITNESS:
A. C. Fairbanks

INVENTOR.
Jozef Kwapien,
BY
Frank A. Cutter,
ATTORNEY.

UNITED STATES PATENT OFFICE.

JOZEF KWAPIEN, OF WESTFIELD, MASSACHUSETTS.

RESILIENT WHEEL.

1,254,413.  Specification of Letters Patent.  Patented Jan. 22, 1918.

Application filed August 21, 1917. Serial No. 187,336.

*To all whom it may concern:*

Be it known that I, JOZEF KWAPIEN, a subject of the Emperor of Austria, residing at Westfield, in the county of Hampden and State of Massachusetts, United States of America, have invented a new and useful Resilient Wheel, of which the following is a specification.

My invention relates to improvements in resilient or self-yielding wheels for vehicles, and consists of a hub and spring-pressed, telescoping spokes provided with means to compress and hold the springs under compression while a tire is being mounted or demounted, together with a tire of yielding material, and means at the ends of said spokes to receive and support said tire, all as hereinafter set forth.

The primary object of my invention is to produce a rimless wheel or a wheel on which a tire of the so-called solid type, in contradistinction to a tire of the pneumatic type, is mounted without any rim support other than saddle-pieces at the outer ends of spring-pressed spokes. I am thus able to obtain a comparatively simple and inexpensive wheel which possesses the necessary degree of resiliency, and is also sufficiently strong and durable.

Another object is to provide such a wheel with adequate and convenient means whereby it is possible to put on and take off the tire with little difficulty and without the use of tools other than a wrench. This is an important advantage as will readily be understood.

The flexibility and resiliency in this wheel are derived from the spring-pressed spokes and the tire, the former yielding inwardly or having radial action, and the latter yielding at points between the supporting members therefor, which members are spaced from each other.

Still another object is to provide in a wheel of this type parts that can easily and quickly be assembled, and as easily and quickly disassembled if desired, so that the shipping and repair facilities and the readiness with which a broken part can be replaced are very great.

Other objects and advantages will appear in the course of the following description.

I attain the objects and secure the advantages of my invention by the means illustrated in the accompanying drawings, in which—

Figure 1:
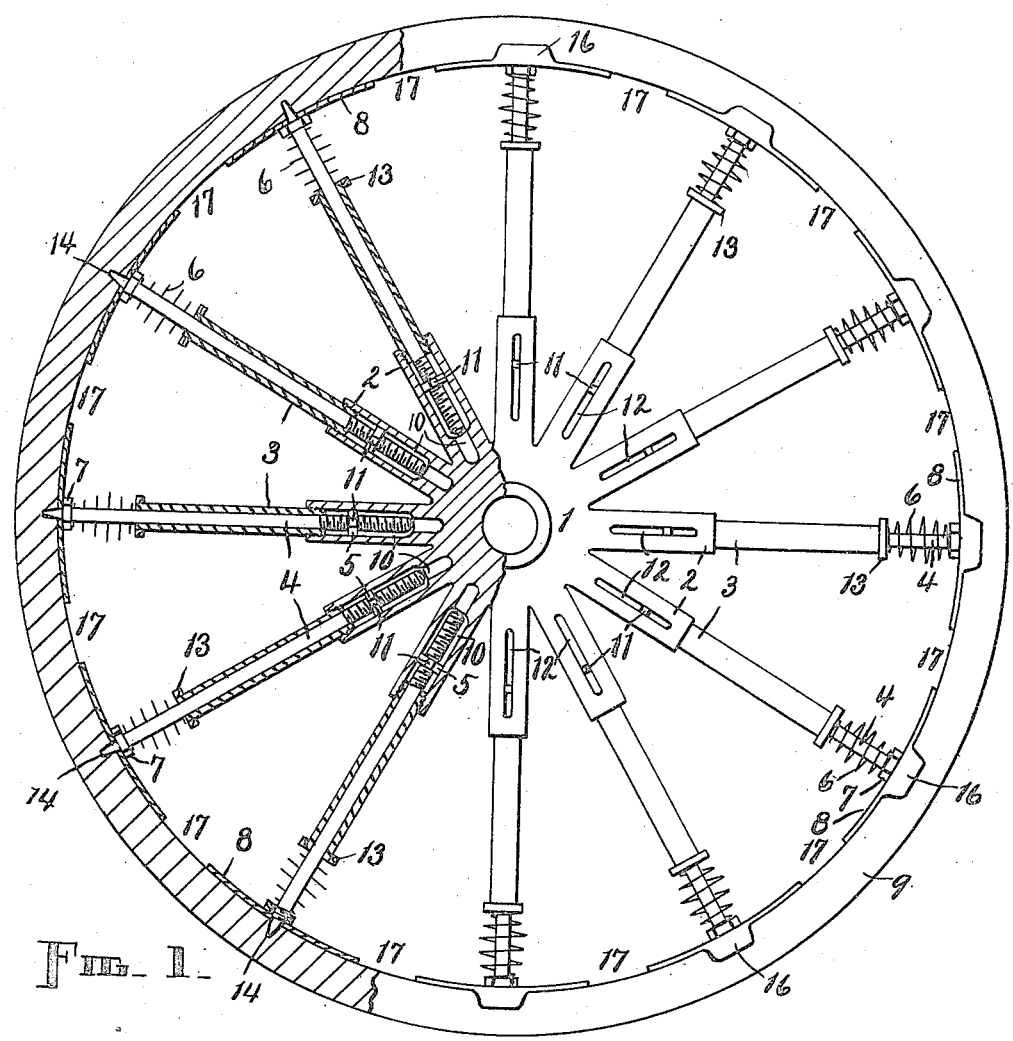
Figure 2:
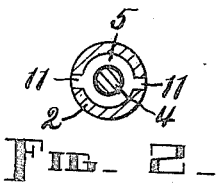
Figure 3:
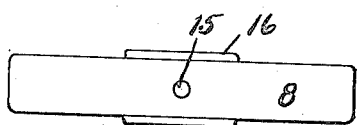

Figure 1 is a side elevation in partial section of a wheel which embodies a practical form of my invention; Fig. 2, an enlarged, cross section through one of the hub arms and the part of the spoke therein, taken immediately adjacent to the nut in said arm, and, Fig. 3, an enlarged exterior plan of one of the saddle-pieces.

Similar reference characters refer to similar parts throughout the several views.

The wheel as illustrated comprises a hub 1 having radial socket arms 2, tubular arm extensions 3, spokes 4 tapped at their inner terminals into nuts 5 normally arranged to slide in said arms, spiral springs 6 encircling said spokes between the outer ends of said extensions and laterally projecting members or nuts 7 on the outer terminals of the spokes, saddle-pieces 8 on said spokes outside of said nuts, and a tire 9 on and in said saddle-pieces.

Each hub arm 2 is bored longitudinally, as represented at 10, to receive the inner end of one of the spoke extensions 3, which latter is tapped into such arm, and to provide a cylinder for one of the nuts 5 to slide in, such bore or passage being of sufficient length to accommodate the inner end of the connected spoke 4.

Each nut 5 has oppositely-disposed projections, pins, or lugs 11 which enter and slide in longitudinal slots 12 in opposite sides of each arm 2. The lugs 11 in the slots 12 prevent the nut 5 from rotating in its containing passage 10, without interfering with the reciprocable movement of such nut, except to limit the length of the same, which is done by said lugs and the ends of said slots.

The arm extensions 3 have laterally projecting members in the form here of nuts 13 screwed on to their outer ends to provide seats for the inner ends of the springs 6.

The spokes 4 pass through the extensions 3 into threaded engagement with the nuts 5 in the arms 2. The outer end or terminal portion of each spoke 4, beyond the nut 7 on such spoke, is more or less pointed, as represented at 14, and this terminal portion passes through a central opening 15 in the connected saddle-piece 8, and into the tire 9. The nut 7 on the outer terminal of each spoke 4 affords a seat for the outer end of the contiguous spring 6. The springs 6, bearing between the nuts 13 and 7, normally tend to force the spokes 4 with their saddle-pieces 8 outwardly against the inside of the tire 9, yielding under superior force to assist in rendering the wheel resilient.

The saddle-pieces 8 are curved in conformity to the inside curve of the tire 9, and each saddle-piece has side flanges 16—16 between which such tire is received. The saddle-pieces 8 are spaced apart at the ends thus leaving intervals in the wheel periphery which consist only of the spanning portions of the tire 9. These directly unsupported portions of the tire 9, indicated at 17 in Fig. 1, afford the resiliency which the springs 6 fail to furnish, as will hereinafter be explained.

The tire 9 may be made of any suitable material or combination of materials which possess the flexibility, wearing qualities, and other characteristics necessary in a tire of this kind, materials such as rubber and fabric for example. And said tire may be of any suitable shape and size, to which the saddle-pieces 8 must, of course, be suited and adapted.

In assembling the wheel, the nuts 5 are first inserted in the passages 10, with the lugs 11 in the slots 12, said nuts being thin enough to permit them to be introduced into the open ends of the arms 2 and arranged crosswise of said passages. Then the arm extensions 3 are screwed into place, and the spokes 4 are passed through said arms into the passages 10 and screwed into the nuts 5. Next the springs 6 are slipped over the outer ends of the spokes 4 onto the flanges or nuts 13, and the nuts 7 are screwed on to said spokes, unless said springs and nuts are respectively attached to and placed on said spokes before the latter are inserted in the extensions 3, as may be done. The springs 6, having forced the spokes 4 outwardly as far as the nuts 5, the lugs 11 of which are now in contact with the outer ends of the slots 10, permit, it becomes necessary to screw said spokes inwardly until said springs are compressed sufficiently to enable the tire 9 to be placed in position, which is done. Then the saddle-pieces 8 are placed on the spoke ends 14 and the tire on said saddle-pieces between the flanges 16. Finally the spokes 4 are rotated to release the springs 6 so that they force said spokes outwardly as far as the tire 9 will permit, such rotation of said spokes being continued until the nuts 5 have traveled inwardly on the spokes a sufficient distance from the inner ends of the extensions 3 to afford all the reciprocating play that is needed for the spokes. The spoke ends 14 pass through the saddle-pieces 8 into the tire 9 to prevent the latter from creeping on the saddle-pieces.

The wheel is now complete with the tire held securely in place.

The springs 6 furnish a certain proportion of the resiliency, and the bridge portions at 17 of the tire 9 furnish the balance of said resiliency. The springs on the spokes which, with the wheel in any given position, are horizontal and nearly horizontal, do not yield, but the bridge portions 17 that are adjacent to such spokes do yield, wherefore the necessary amount of resiliency in the wheel as a whole is obtained, as will be readily seen. The bridge portions 17 also afford a certain amount of resiliency at other points besides those adjacent to the horizontal diameter of the wheel.

As the wheel revolves under its load, the spokes 4 with the connected parts and members reciprocate in the arms 2 and the extensions 3, the nuts 5 now being free to move in both directions in the passages 10. Said passages are deep enough to allow the spokes to move inwardly as far as is necessary.

When it is desired to remove the tire 9, the spokes 4 are again rotated to actuate the nuts 5 into the extreme limit of their outward travel and then to carry said spokes farther into the passages 10, so as to compress the springs 6 to the extent necessary for the release of said tire. In this manner the spoke ends 14 are drawn out of engagement with the tire and the saddle-pieces 8 are loosened, so that the tire can be removed without difficulty. After another tire has been placed in position around the saddle-pieces, the spokes are rotated in the opposite direction as much as may be necessary to effect the securing of said tire in place and to relocate the nuts at points intermediate of the ends of their travel.

Owing to the facility with which this wheel can be repaired and the tire changed, said wheel is especially well adapted for army and general field use.

The tire 9 and more especially the interior portion thereof, that is, the inner peripheral portion, should be made of material which is capable of withstanding the wear incident to contact with the saddle-pieces 8, and the tire as a whole must be of a durable character calculated to endure the strain and action to which the bridge portions 17 are subjected.

Changes in the shape, size, construction, and arrangement of some or all of the parts of this wheel may be made without departing from the spirit of my invention, provided the scope of the appended claims be not exceeded.

What I claim as my invention, and desire to secure by Letters Patent, is—

1. A resilient wheel comprising a hub, yielding spokes connected with said hub, said spokes comprising spring-pressed members provided with tire-supporting members, springs for said first-named members, and means to retract and hold said spring-pressed members in retracted position, with their springs under increased compression, for the purpose of mounting a tire on or removing it from said tire-supporting members.

2. The combination, in a resilient wheel, with a hub having hollow arms, tubular extensions attached to said arms, spokes slidingly arranged in said extensions and arms, and having laterally projecting members at their outer terminals, nuts on said spokes in said arms, means to limit the outward movement of said nuts in said arms, and to hold said nuts against rotation, and springs between the outer ends of said extensions and said projecting members, of saddle-pieces attachable to said outer terminals of said spokes, and a tire mounted on said saddle-pieces.

3. The combination, in a resilient wheel, with a hub having hollow slotted arms, tubular extensions attached to said arms, spokes slidingly arranged in said extensions and arms, and having laterally projecting members at their outer terminals, nuts on said spokes in said arms, said nuts having lugs which extend into and operate in the slots in said arms, and springs between the outer ends of said extensions and said projecting members, of saddle-pieces attachable to said outer terminals of said spokes, and a tire mounted on said saddle-pieces.

4. The combination, in a resilient wheel, with a hub having hollow arms, tubular extensions attached to said arms, spokes slidingly arranged in said extensions and arms and having laterally projecting members at points somewhat remote from their outer terminals, nuts on said spokes in said arms, means to limit the movement of said nuts in said arms and to hold said nuts against rotation, and springs between the outer ends of said extensions and said projecting members, of saddle-pieces attachable loosely to said outer terminals of said spokes and bearing on said projecting members, and a tire mounted on said saddle-pieces, said spokes penetrating said tire after passing through said saddle-pieces.

JOZEF KWAPIEN.

Witnesses:
F. A. CUTTER,
ANDRO BABINOKI.